United States Patent

Damiron et al.

[11] 4,298,812
[45] Nov. 3, 1981

[54] GAS COOLED ROTOR FOR AN ELECTRIC MACHINE

[75] Inventors: René Damiron, Cravanche; Roger Gillet, Belfort; Jean-François Heuillard, Cravanche; Gilbert Ruelle, Belfort, all of France

[73] Assignee: Alsthom-Atlantique, Paris, France

[21] Appl. No.: 88,421

[22] Filed: Oct. 25, 1979

[30] Foreign Application Priority Data

Nov. 3, 1978 [FR] France .................. 78 31119

[51] Int. Cl.³ .............................................. H02K 1/32
[52] U.S. Cl. ........................................ 310/61; 310/55; 310/65; 310/214
[58] Field of Search .................. 310/61, 64, 65, 59, 310/58, 55, 214, 215, 261, 52, 60 R, 60 A

[56] References Cited

U.S. PATENT DOCUMENTS

| | | | |
|---|---|---|---|
| 2,903,609 | 9/1959 | Waddington | 310/64 |
| 3,075,104 | 1/1963 | Willyoung | 310/64 |
| 3,119,033 | 1/1964 | Horsley | 310/64 |
| 4,152,610 | 5/1979 | Wallenstein | 310/59 |

FOREIGN PATENT DOCUMENTS 2294577 7/1976 France .................. 310/64

Primary Examiner—R. Skudy
Attorney, Agent, or Firm—Sughrue, Mion, Zinn, Macpeak and Seas

[57] ABSTRACT

The invention relates to a gas-cooled rotor for an electric machine. At each axially separated rotor slot, cooling ducts are supplied with cold gas by the duct of a lower cavity and form a parallel network in the upper levels (B) of the slot cavity (1). Said network includes a radial inlet duct (6), a plurality of transverse ducts (8) constituted by grooves in the conductor strips and a radial outlet duct (7) so as to increase the heat exchange surface at these upper levels and to avoid excessive heating thereof despite the heating of the gas in the lower levels (A). Application to turbo alternator rotors.

3 Claims, 8 Drawing Figures

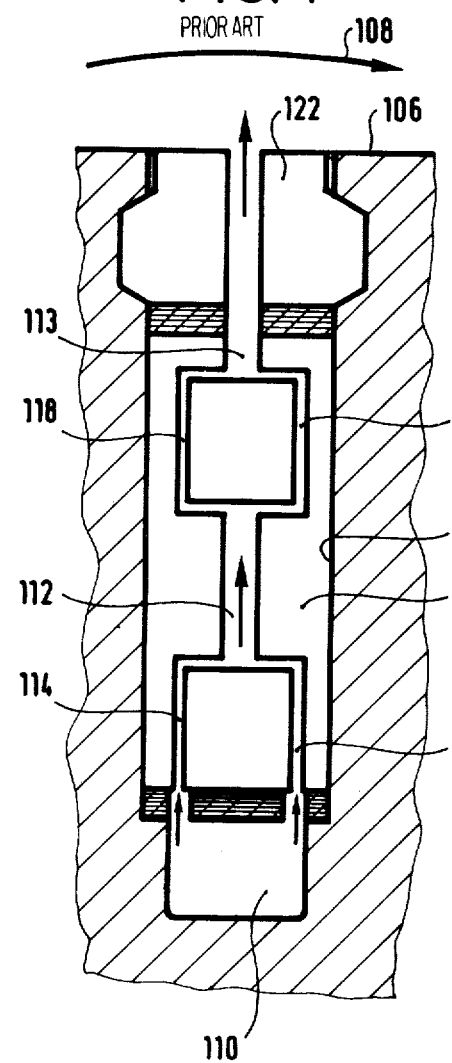
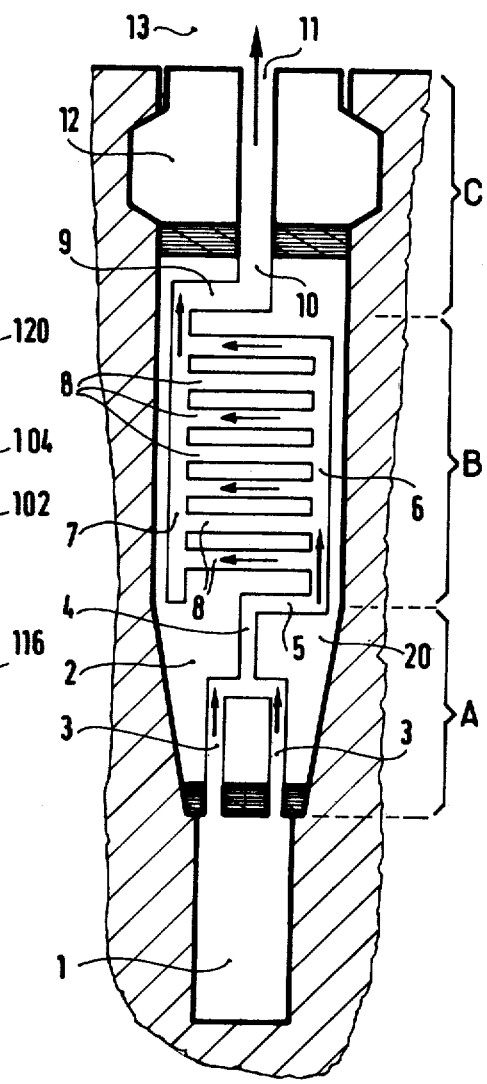

GAS COOLED ROTOR FOR AN ELECTRIC MACHINE

FIELD OF THE INVENTION

The invention relates to the rotor of an electric machine in which the rotor is cooled by a flow of gas in ducts formed in the copper conductors of the rotor winding, i.e. in the strips of copper which constitute the conductors of the winding. It applies more particularly to rotors for turboalternators.

BACKGROUND OF THE INVENTION

In a first known ventilation system, the cooling gas flows in axially at each of the two ends of the rotor through lower cavities disposed under main cavities in which the winding is installed. (Here, the expression "below the cavities" means "on the rotor axis side of the cavities" and likewise, the expression "upper part" and "lower part" or the like designate hereinafter the parts situated nearest and furthest from the axis respectively). These lower cavities distribute cold gas in the regularly spaced radial passages formed directly in the copper conductors of the winding.

As it flows radially along the cavity, the gas removes heat lost from the induction winding and is hot when it leaves the air gap.

The temperature to which gas is heated as it flows radially and the local difference between the temperature of copper conductors and that of the gas depend on both the amount of heat to be removed and the internal arrangement of the cooling ducts through which the gas flows.

French patent No. 1 449 036 describes a particularly favourable disposition of the radial arrangement of the internal ducts. In said disposition, the cooling ducts are arranged alternately.

French patent No. 2 241 905 (Ganz Villamossagi Müvek) describes a second ventilation system in which the lower parts of the cavity are cooled by the gas which flows in the transverse ducts which are fed from a lower cavity via a central radial duct; the gas flows into the air gap via radial side ducts (the radial direction being that of a straight line which meets the axis of the rotor at right-angles, the longitudinal or axial direction being that which is parallel to the axis of the rotor and the transverse direction being that which is perpendicular to both the longitudinal and radial directions). In the second system, the upper parts of the cavity are cooled by the gas which flows in transverse ducts which are fed in parallel from the air gap via a radial side duct, the gas returning to the air gap via another side duct. The radial side ducts of the lower and upper parts of the cavity form a continuous passage so that in some transverse ducts, the gas which comes from the air gap mixes with that which comes from the lower cavity.

The first ventilation system has a disadvantage related to the fact that the gas which flows in the upper part of the cavity is already heated in the lower part. The disadvantage is that the upper part is less efficiently cooled by an already heated gas than the lower part by a gas which is still cold. Hence, there is a great difference in temperature between the conductors of the upper part and those of the lower part.

The second ventilation system has two important disadvantages. The first is that it is complicated and therefore expensive, since it requires firstly a lower cavity and a system for feeding it and secondly it requires aerodynamic systems to be formed, said aerodynamic systems using the rotation of the rotor to draw off the cooling gas from the air gap and to return it thereto. The second disadvantage is that the proper distribution of the pressure and of the flow of the gas in the ducts depends on the proportion between two magnitudes. The rotation speed of the rotor is the condition for the first of these magnitudes, namely the differential pressure generated by the aerodynamic systems for drawing off and returning the gas of the air gap. The second of the magnitudes is the difference in pressure between the lower cavity and the air gap. In particular, it depends on the distance to be covered by the gas in the lower cavity, from the point where it enters the rotor. In some cases a great relative variation of these two magnitudes can cause a poor distribution of the gas flow and improper cooling of some transverse ducts.

Preferred embodiments of the present invention provide a simple means for increasing the efficiency of the ventilation system while reducing both the average temperature rise of the winding and the temperature difference between the copper conductor at the top of the cavity and the copper conductor at the bottom of the cavity.

The present invention advantageously modifies the disposition of the cooling ducts in the upper part of the cavity while in the lower part of the cavity, the disposition is still that described in French patent No. 1 449 036 or a similar disposition.

SUMMARY OF THE INVENTION

The present invention provides a rotor of an electric machine, said rotor being cooled by gas which flows in ducts provided inside cavities which contain the induction winding, the rotor having two types of coil conductor in the cavities, namely:

those in the lower part of the cavity which constitute a stack of perforated copper conductors in which slot-shaped radial ducts provide a radial path for the gas round a simple or double radial duct system; and those in the upper part of the cavity which constitute a stack of grooved copper conductors in which transverse ducts and radial ducts are formed, said radial ducts supplying said transverse ducts in parallel so as to form an essentially transverse ventilation circuit in the form of a radiator.

BRIEF DESCRIPTION OF THE DRAWINGS

A description of how the invention can be used is given hereinafter by way of a non-limiting example and with reference to the schematic figures of the accompanying drawings. Components which are illustrated in several figures bear the same reference symbols therein. In the drawings:

FIG. 1 is a partial cross-section of a known rotor whose axis is perpendicular to the plane of the figure and located below the figure;

FIG. 2 is a partial cross-section of a rotor in accordance with the invention, the axis of the rotor being likewise perpendicular to the plane of the figure, and located below the figure;

DESCRIPTION OF PREFERRED EMBODIMENTS

Figure 3:
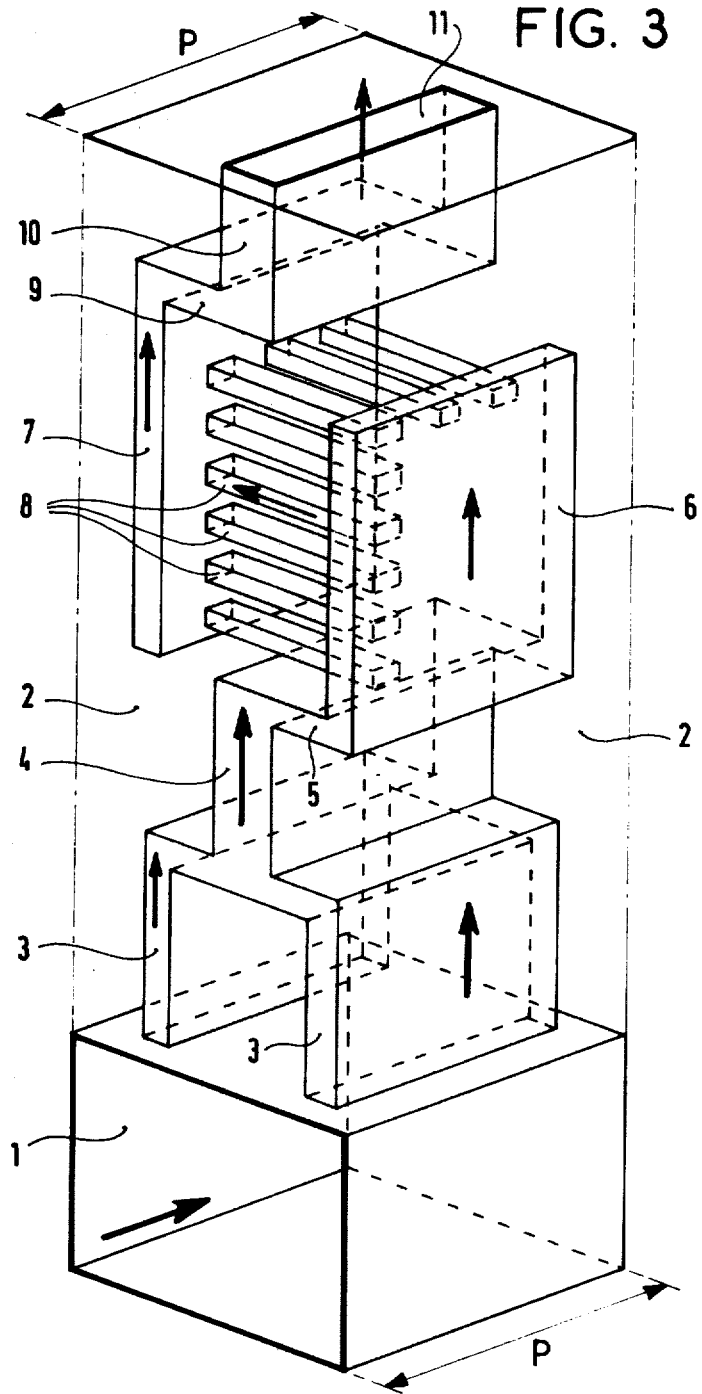
FIG. 3 is a perspective view showing the deposition of the ducts of the rotor of FIG. 2, over one unit of axial pitch, it being assumed that all the material around the ducts is transparent.

FIG. 1 summarises the disposition known through above mentioned French patent No. 1 449 036, in which the ducts are internally arranged in an alternate radial system.

In that ventilation system, a winding 102 is placed in a cavity 104 formed axially in the outer surface of a rotor 106 of a turbo-alternator. The rotor rotates in the direction of the arrow 108 about the axis perpendicular to the plane of the figure. The winding is cooled by cool gas which arrives axially along a lower cavity 110 disposed axially below the cavity 104. The gas flows away substantially radially towards the periphery of the rotor. The gas flows alternately via pairs of parallel ducts, (first 114 and 116, then 118 and 120) and via single common ducts (first 112, then 113). Then it flows into the air gap through a cavity retainer member 122 which retains the conductors despite centrifugal force.

With reference to FIGS. 2 and 3, a description will be given to show how the invention is applied in a rotor of the same type as that described with reference to FIG. 1.

Over one unit of axial pitch P in the iron core portion of the rotor, the lower cavity 1 in the form of an axial duct below the cavity 20 supplies cold gas to a set of ducts formed in the copper conductors 2 of the induction winding.

In a first part which corresponds to zone A at the end of the cavity, the rectangular ducts 3 and 4 in the copper conductors are disposed so as to fit into the alternate radial system.

In a second part B near the top of the cavity, radial passages 6 and 7 enable the gas to flow through transverse ducts 8 of small cross-section which constitute the effective part of the cooling system in zone B. The number of transverse ducts 8, both along the radial height of zone B and along the axial pitch P of the radiator system thus constituted, is such as to provide the best cooling efficiency of the zone.

Zones A and B communicate via a transverse duct 5 which connects together radial ducts 4 and 6.

Lastly, the radial duct 7 allows the gas to flow into the air gap 13 via zone C through ducts 9 and 10 and holes 11 in rotor cavity retainer and closing members 12.

In accordance with the invention, the copper conductors used in the bottom of the cavity are perforated and those used in the top of the cavity are both grooved and perforated.

The internal disposition of the ducts in zones A and B is non-limiting; therefore:

in zone A, optionally, only one system constituted by a single radial duct and not an alternate system could be used; and in zone B, the radial ducts 6 and 7 can either be inside the copper conductors or at their sides. Also, their cross-section is not necessarily constant along the length of the radial path, i.e. in practice, it can decrease upwards in the case of the inlet duct 6 and increase upwards in the case of the outlet duct 7.

The ventilation system in accordance with the invention is particularly advantageous in the case where the height of the cavities is great, i.e. more than 15 cm.

In such a case, in a ventilation system mainly formed by transverse ducts up the whole height of the cavity would make it necessary to choose between two difficulties: either have transverse ducts whose upper cross-sections are different from their lower cross-sections; this would unduly complicate manufacture; or accept great differences in flow between the various transverse ducts.

Figure 4:
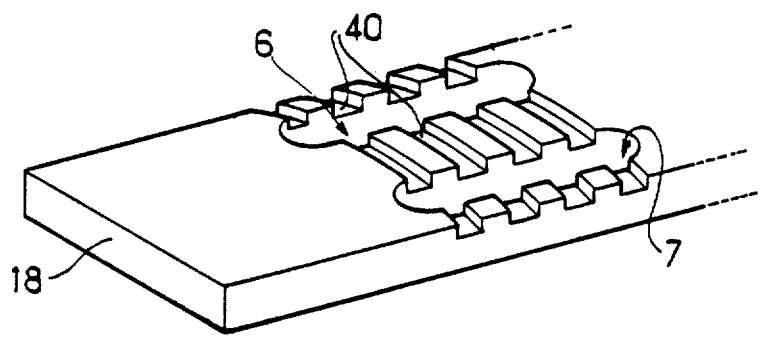
FIG. 4 is a partial perspective view of a conductor in zone B of FIG. 2.

The conductor illustrated in FIG. 4 is in the form of a strip of copper whose width takes up the length of a cavity which has been left available by lateral insulating layers, not shown. Two passages which form the side ducts 6 and 7 are provided in each part of the length of the conductor corresponding to one unit of axial pitch.

These passages are elongate, their length being parallel to that of the conductor, i.e. to the axis of the rotor.

The upper surface of each conductor or of every other conductor or every third conductor also has transverse grooves 40 curved in the shape of arcs of circles all having the same radius and the same direction of concavity.

Figure 5:
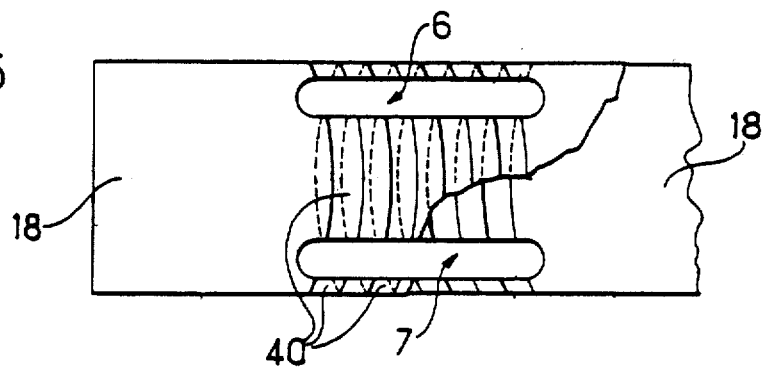
FIG. 5 is a partially cutaway plan of two superposed conductors of the type illustrated in FIG. 4.

As shown in FIG. 5, the direction of concavity alternates from one conductor to the conductor above it or below it so as to prevent the superposition of splines from causing deformations due to centrifugal force.

Figure 6:
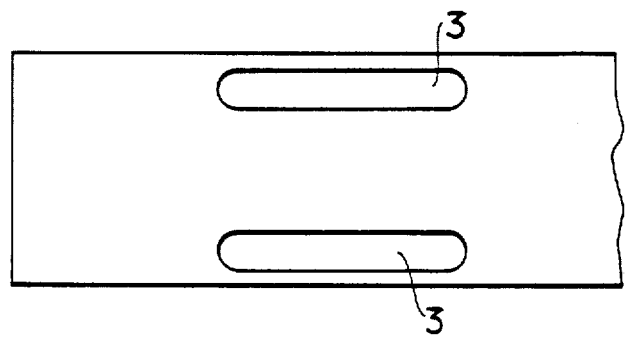
FIG. 6 is a plan of a conductor in the lower part of zone A of FIG. 2.
Figure 7:
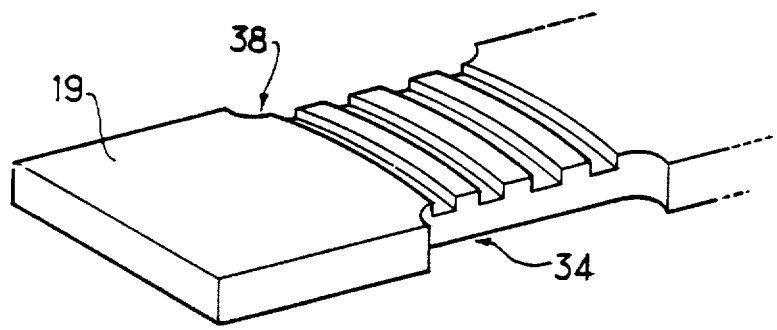
FIG. 7 is a variant of the conductor of FIG. 4 in which the radial ducts are formed at 34 and 38 in the edge of the conductor 19.
Figure 8:
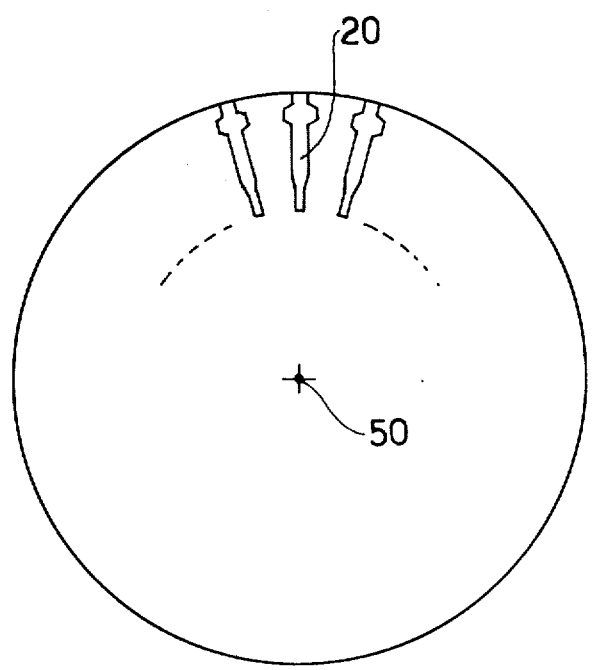
FIG. 8 is a schematic cross-section of the rotor in accordance with the invention showing the positions of the cavities such as 20 spaced out angularly around the axis 50 of the rotor.

In FIG. 6, side ducts 3 are provided corresponding to side ducts 6, 7 of FIG. 5, while in FIG. 7 the side edges of the conductor strip 19 bear opposed recesses 34, 38.

We claim:

1. A rotor of an electric machine, said rotor including radial slots, winding coil conductors within said slots, subslots radially inboard of said slots and extending to the end of said rotor for causing cooling gas to enter said subslots axially and for movement through said radial slots for cooling of said winding coil conductors, cooling ducts shaped in said conductors and receiving said cooling gas, the improvement wherein said conductors are formed of first and second types, said first type being radially inward of said second type, said first type constituting a stack of perforated copper strips bearing slot-shaped first radial ducts providing a substantial radial path for the gas moving radially outwardly from said subslots through said first radial ducts provided within said first type coil conductors; said second type conductors comprising a stack of grooved copper strips, each strip including transverse ducts, said stack of grooved conductors forming second radial ducts on opposite sides of said stack, one of said second radial ducts being blocked at its radially outer end and being open at its radially inner end and in fluid communication with said first radial ducts, the other of said second radial ducts being closed off at its radially inner end and in open communication at its radially outer end to the periphery of said rotor such that said transverse ducts and said first and second radial ducts form an essentially transverse ventilation circuit in the form of a radiator and wherein said gas flows from said subslot radially through said first radial ducts within said first type coil conductors and enters said one second radial duct at the radially inner end thereof and passes transversely through said transverse ducts in parallel and exits radially from said other second radial duct through said radially outer end to the periphery of said rotor to effectively cool said first and second type conductors by cooling gas supplied solely from said subslots.

2. A rotor according to claim 1, wherein the height of the slot cavity is greater than 15 cm.

3. A rotor according to claim 1, wherein the said transverse ducts are curved, the direction of curvature alternating from one conductor layer to the next.

* * * * *